Aug. 21, 1951 R. W. JOHNSON 2,565,235
COFFEE BREWING APPARATUS
Filed July 12, 1950 5 Sheets-Sheet 1
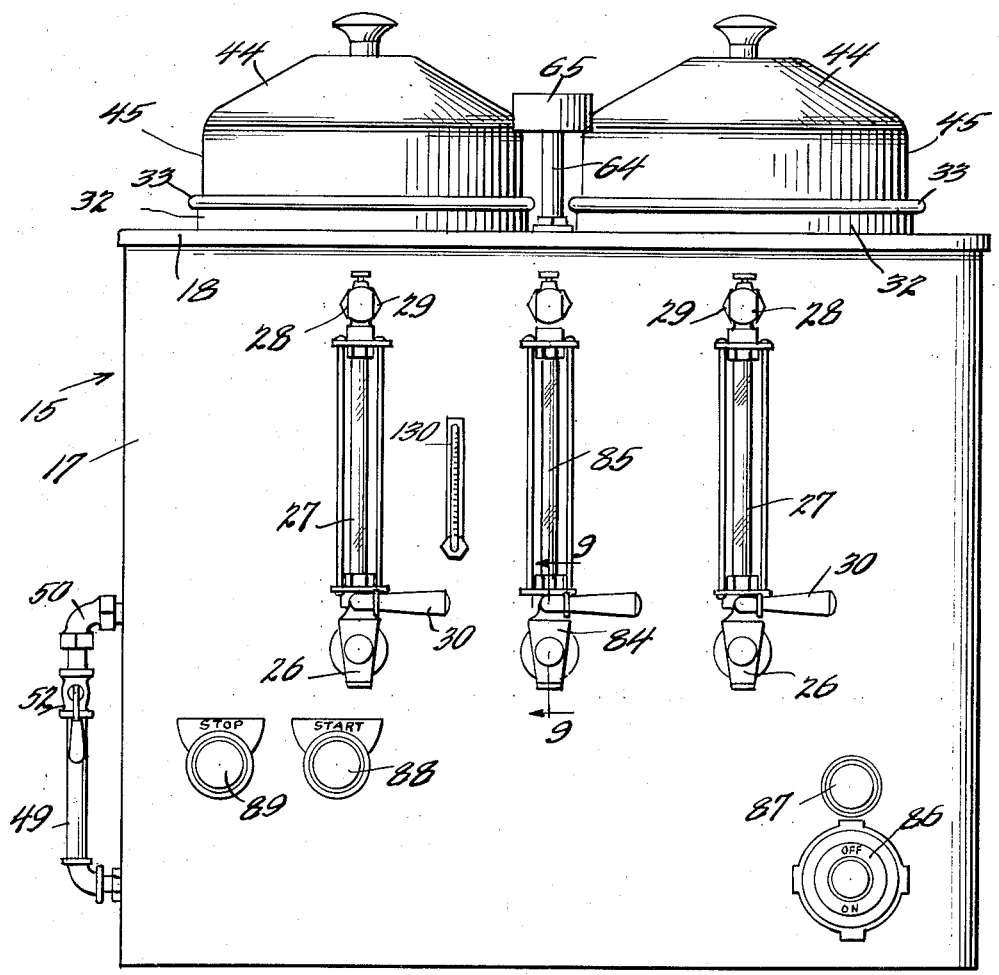
INVENTOR
Rudolph W. Johnson,
BY
ATTORNEYS Aug. 21, 1951     R. W. JOHNSON     2,565,235
COFFEE BREWING APPARATUS
Filed July 12, 1950     5 Sheets-Sheet 2
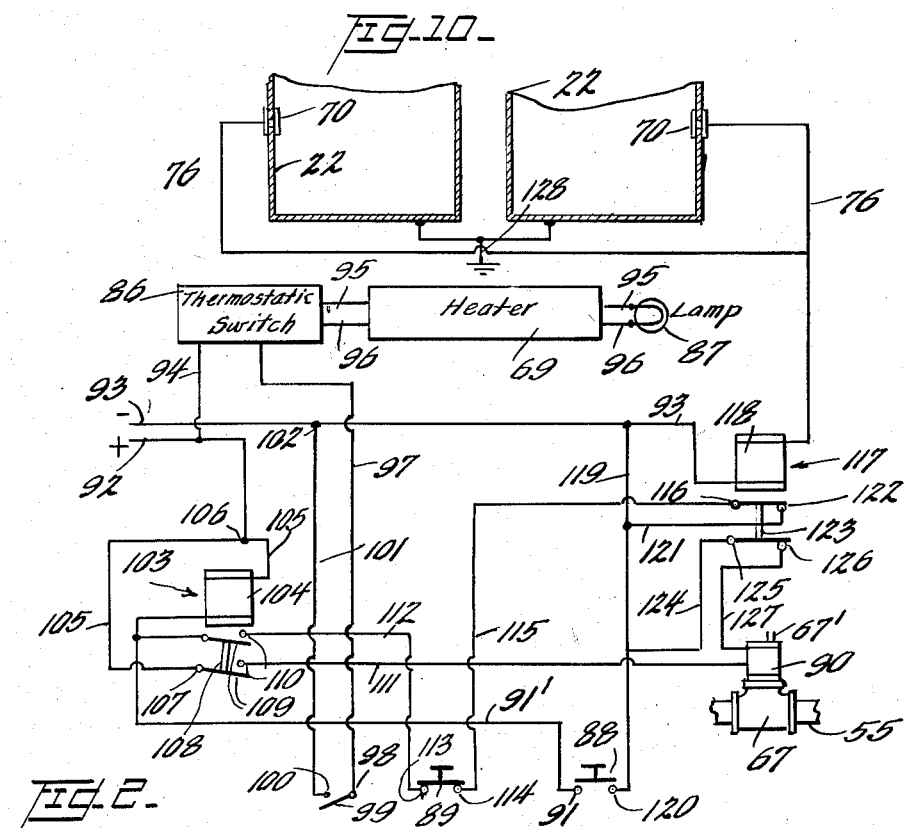
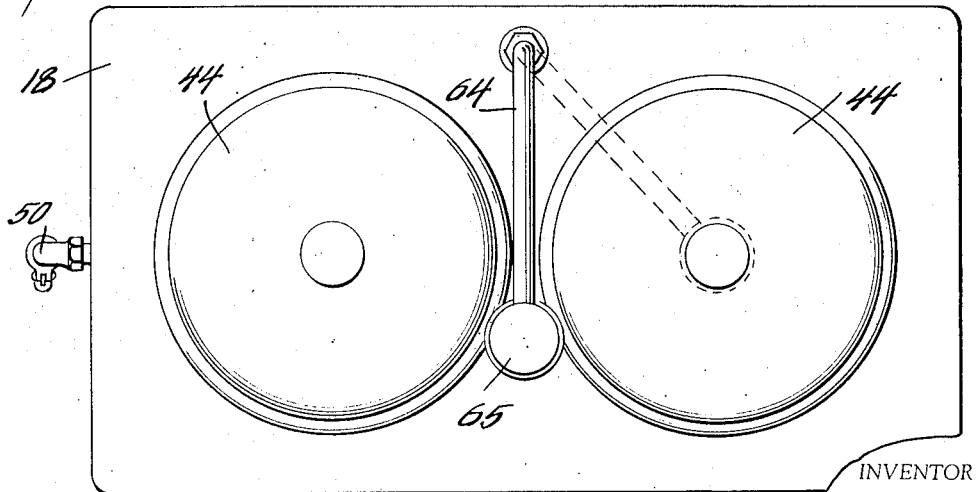
INVENTOR
Rudolph W. Johnson,
BY
Cushman Darby Cushman
ATTORNEYS Aug. 21, 1951
R. W. JOHNSON
2,565,235
COFFEE BREWING APPARATUS
Filed July 12, 1950
5 Sheets—Sheet 3
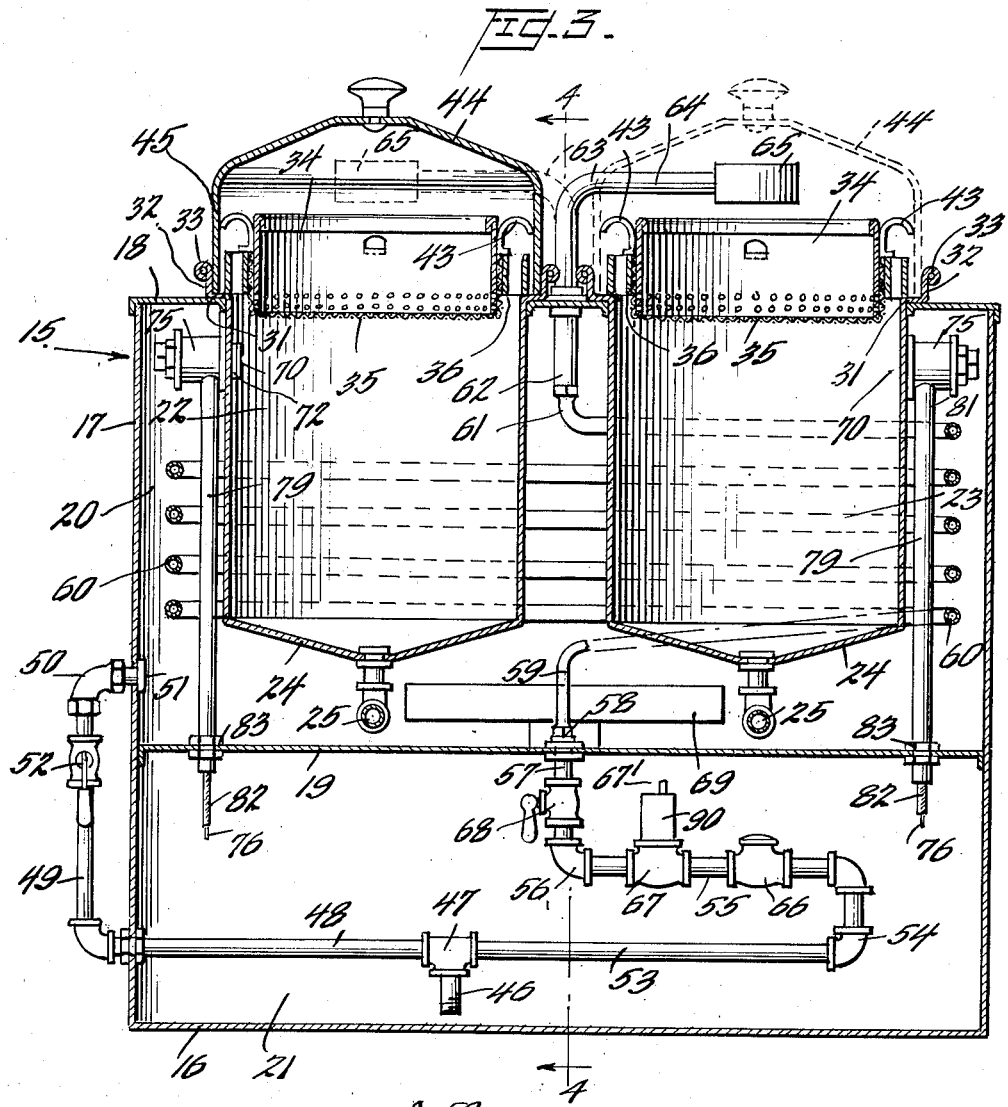
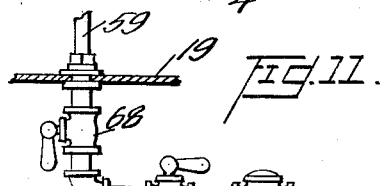
INVENTOR
Rudolph W. Johnson,
BY
ATTORNEYS Aug. 21, 1951 R. W. JOHNSON 2,565,235
COFFEE BREWING APPARATUS
Filed July 12, 1950 5 Sheets-Sheet 4
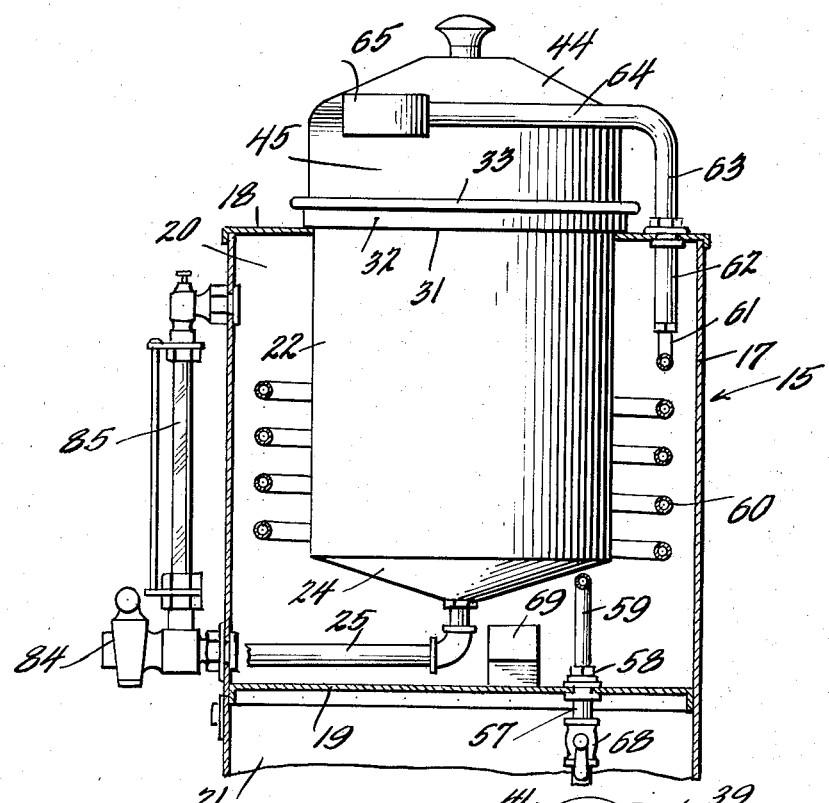
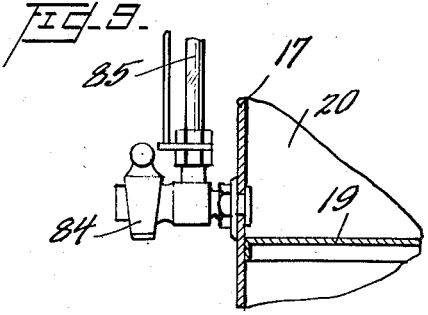
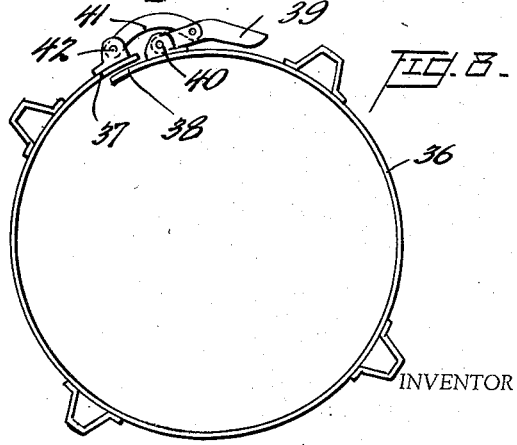
INVENTOR
Rudolph W. Johnson,
BY
ATTORNEYS

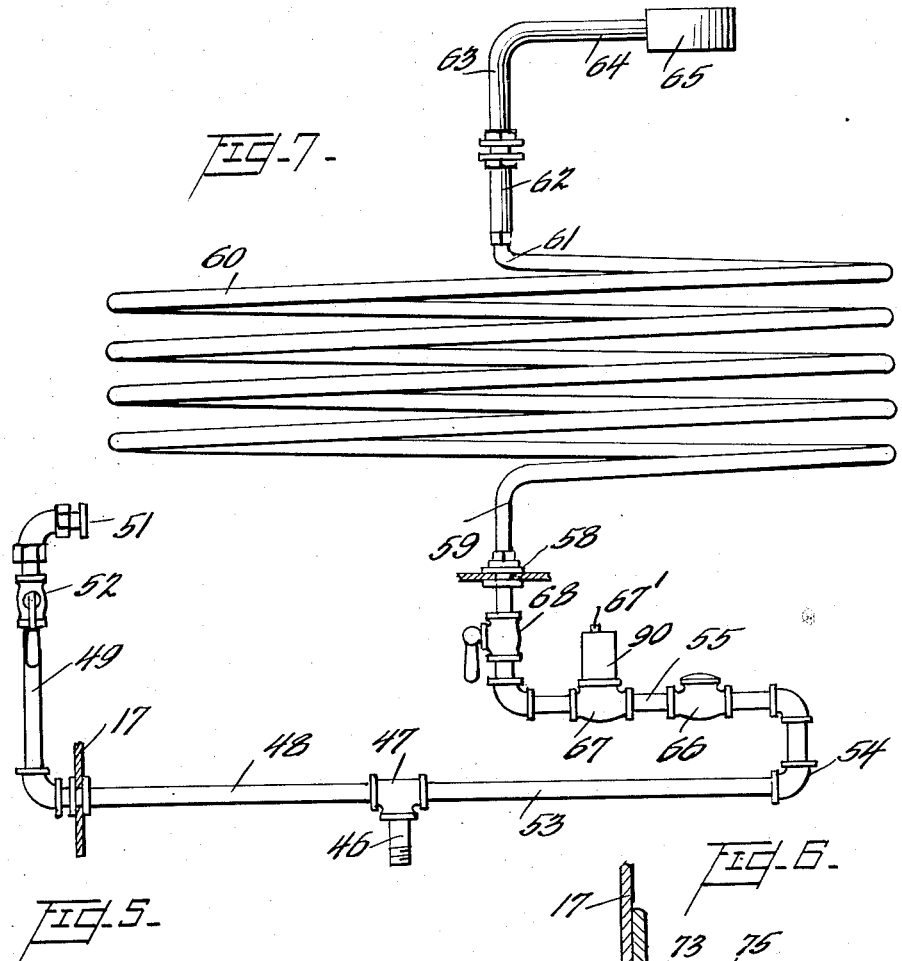
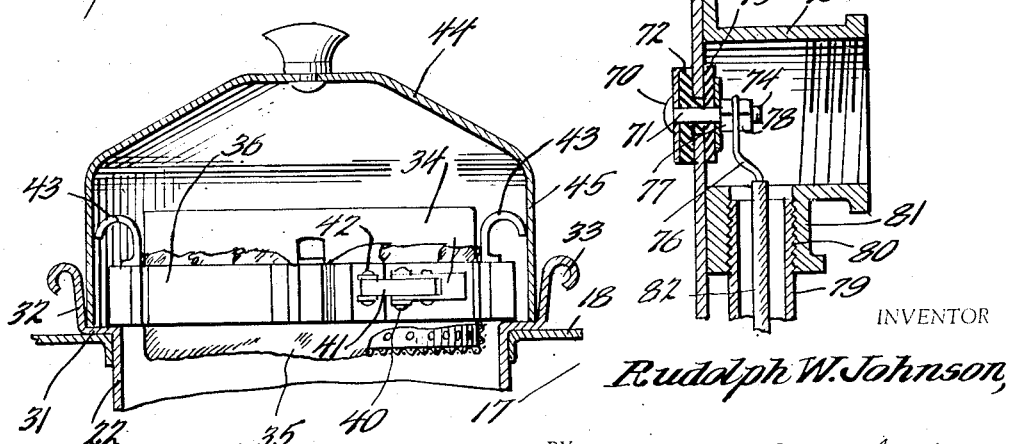

Patented Aug. 21, 1951

2,565,235

UNITED STATES PATENT OFFICE 2,565,235

COFFEE BREWING APPARATUS

Rudolph W. Johnson, Portland, Oreg., assignor to Boyd Coffee Company, Portland, Oreg., a corporation of Oregon Application July 12, 1950, Serial No. 173,417

1 Claim. (Cl. 99—282)

The present invention relates to a new and improved apparatus for brewing coffee.

Heretofore, the water used in making coffee has not always been heated to the proper temperature with the result that the brewed coffee has been weak and unflavory. Moreover, the water used in making the coffee is drawn from a storage tank incorporated in the structure of the urn which is difficult to clean and which allows the accumulation of foreign deposit that detracts from the natural flavor and taste of the coffee. Not infrequently, the water used to make the coffee is allowed to remain in the tank too long and thus looses its oxygen or life so that the coffee made with such water has a stale and flat taste. It has also been customary in brewing coffee for the operator to transfer manually the boiling water in the urn to the coffee receptacle with the attendant danger of being scalded and at the expenditure of considerable time and labor.

Accordingly, an important object is to provide a coffee making apparatus having means which eliminates these objectionable features and which insures the brewed coffee having a uniform, palatable flavor and taste by boiling the water used in making the coffee to a uniform temperature and utilizing the water heated in the apparatus for this purpose.

Another object consists in associating with the apparatus means for drawing the water to be used in the brewing of the coffee directly from the fresh water pipe or source of supply, heating the water to a predetermined temperature, and spraying the heated water over the coffee grounds so that the finished coffee brew has a savory and rich flavor.

A further object comprehends the provision of a coffee making apparatus including a container having a water heating chamber or compartment therein. Extending into the heating chamber may be one or more coffee receptacles which are immersed in the heating water introduced into the chamber. A heating tube is directly connected at one end to a source of fresh water supply and extends into the heating chamber, and is preferably coiled so as to encircle or surround the coffee receptacles. The opposite or upper end of the heating tube is connected to a swivel spray arm which is arranged selectively to be positioned over one of the receptacles to discharge the heated water circulating through the tube onto the coffee grounds in the receptacle during the brewing operation. A suitable heating means such as an electrical burner or the like is used to heat the water introduced into the heating chamber and this water, in turn, is utilized to heat the water circulating through the heating tube to a predetermined or set temperature so as to insure the brewed coffee having a uniform, palatable flavor and taste.

A further object is to provide an apparatus for making coffee having means which insures the different batches of coffee being mixed with the heated water at a uniform and proper temperature so as to insure the finished brew having a palatable and savory taste, and which requires a minimum of handling during the brewing operation. Additionally, thermostatically controlled means are provided for automatically stopping the brewing of the coffee at the proper time so that the coffee is treated at a uniform temperature and its flavor is not impaired by either being insufficiently heated or overheated.

Other objects and advantages of the invention will become apparent from the following description when taken in conjunction with the accompanying claim and drawings.

Referring to the drawings in which is shown a preferred embodiment of the invention:

Figure 1 is a view of a coffee making machine constructed in accordance with the present invention.

Figure 2 is a plan view of Figure 1.

Figure 3 is a vertical sectional view of the apparatus.

Figure 4 is a sectional view taken substantially along the line 4—4 of Figure 3.

Figure 5 is a detailed sectional view of the upper end portion of the coffee receptacle and the closure therefore.

Figure 6 is a detailed sectional view taken substantially along the line 6—6 of Figure 3.

Figure 7 is a diagrammatic view of the water supplying system.

Figure 8 is a plan view of one of the extractor coffee baskets.

Figure 9 is a detail sectional view taken substantially along the line 9—9 of Figure 1.

Figure 10 is a diagrammatic view of the electrical system associated with the apparatus for clearly showing several of the parts located different than they are positioned in the apparatus, and Figure 11 is a detail perspective view showing manual valve means for controlling the flow of the water into the heating coils.

Referring to the drawings, 15 indicates a metal container or housing of any suitable size and shape and which is preferably formed with a bottom 16, sides 17, and a flange top 18. Additionally, the interior of the container is separated by a partition 19 (Fig. 3) into an upper compartment 20 and a lower compartment 21. The upper compartment 20 is arranged to provide a combined water storage and heating chamber and the top 18 is formed with one or more openings through which extends the coffee receptacles 22 and 23. Each of these receptacles may be formed with a downwardly inclined bottom 24 (Fig. 4) which centrally communicates with a pipe 25 that extends outwardly through the front side of the container and has connected thereto a discharge faucet or valve 26. Extending upwardly from the faucet is a glass tube or gauge 27 which is connected as at 28 to a tubular member 29 secured to the side of the container. The discharge of the fluid in each of the pipes 25 through the faucet 26 is controlled by a manually operating handle 30. The upper end of each of the receptacles 22 may be formed with an enlarged annular shoulder 31 arranged to abut against the top 18 so as to limit the inward movement of the receptacles into the chamber 20. Extending upwardly from the shoulder 31 is a diverging portion 32 (Fig. 5) which terminates in an annular bead 33 so as to facilitate the handling of the receptacle.

Insertable in the upper portion of each of the receptacles 22 is a perforated coffee basket 34 with which is associated a filter cloth 35 (Fig. 5) and a ring clamp or strap 36. The clamp 36 is split so as to form the opposed overlapping ends 37 and 38 (Fig. 8) that are arranged to be contracted and expanded relative to each other by an operating lever 39 pivoted as at 40 to the end 38 and pivotally connected by a link 41 to the end 37 as at 42. The band 36, when the parts are assembled, rests on the shoulder 31 of the receptacle 22 and the manual handling of the basket may be facilitated by the circumferentially spaced straps 43, each of which is secured to the outer side of the basket (Fig. 5). The upper portions of the receptacles 22 and 23 and their associated coffee baskets are enclosed within removable caps 44 preferably shaped as shown in Figure 5 and both have depending skirts 45 that abut the shoulders 31.

Water or other fluid heating means from any suitable outside source may be introduced into the chamber 20 through a main supply pipe or line 46 (Fig. 3) which extends into the bottom compartment 21 and is provided with a T-fitting 47 to which is connected a horizontal branch pipe 48 that extends outwardly through the side 17 and is connected to an upwardly extending pipe 49 which, in turn, is connected by the elbow 50 to a discharge pipe or nozzle 51 that communicates with the chamber 20 so as to conduct a supply of water thereto. A manually operating valve 52 may be connected to the pipe 49 to control the flow of the water discharged into the heating chamber 20. A second branch pipe 53 in the compartment 21 communicates at one end with the fitting 47 and at its opposite end to an elbow 54 which, in turn, communicates with a pipe 55 that is connected through the elbow 56 with a vertically disposed pipe 57 extending upwardly through the partition 19 into the compartment 20 so as to be connected as at 58 to the lower end 59 of a copper heating tube 60. The tube 60 is coiled within the water storage and heating chamber 20 to encircle or surround the receptacles 22 and 23 and has pivotally connected to its upper end 61 as at 62 (Fig. 3), a tubular spray arm 63 which is bent laterally as at 64 and terminates in a discharge nozzle or head 65 arranged to be swung to a position centrally above each of the receptacles 22 and 23 and the coffee baskets 34 so as to discharge the heated water circulating through the coils of the tube 60 into one of the receptacles during the coffee brewing operation. Connected to the pipe 55 may be a check valve 66 and a fluid control valve casing 67 in which is mounted any suitable valve having an operating stem 67'. The valve stem 67' may be either manually or electrically operated for controlling the flow of the water directly from the supply pipe 46 through the heating tube 59 so as to discharge from the nozzle 65 into the receptacle and contact with the ground coffee which has previously been placed in the basket 34. A manually operated valve 68 may also be connected to the pipe 55 for adjusting or regulating the flow of the water through the tube 59 and the discharge pipe 64. Mounted within the chamber 20 adjacent the bottom thereof is a suitable heating element, such as a burner 69, which may be in the form of an electrical heater for raising the temperature of the water introduced into the chamber 20 through the pipe 51 to the desired boiling temperature. This heated water is then used to constitute the means for heating the tube 60 and the water circulated therethrough directly from the supply pipe 46 prior to the discharge of the same through the nozzle 65 into the top of one of the receptacles 22 and coffee basket 34. Positioned within the tank 20, preferably adjacent the outer side of each of the receptacles 22 and 23, are electrodes 70, each of which extends into a receptacle at a point adjacent the top thereof and which, as shown in Figure 6, may be in the form of a transverse bolt 71 extending outwardly through the side 17 of the container or urn and may be spaced therefrom by the washers 72 and 73 on opposite sides of the container. The bolt 71 has a threaded portion 74 extending into a tubular housing 75 and is connected to a lead wire 76 by a washer 77 and retaining nut 78. The wire 76 extends downwardly through a tubular support or standard 79 and is connected to the electrical wiring system in a manner as will be subsequently described. The standard 79 is threadedly connected at its upper end as at 80 to the inner wall of a depending tubular portion 81 (Fig. 6) of the housing 75. The wire 76 may be insulated by the covering 82 so as to prevent being brought in contact with any of the metal parts of the container. The lower end of each of the standards 79 is firmly secured or clamped in position to the partition 19 by the retaining nuts 83 (Fig. 3).

The water delivered into the chamber or compartment 20 through the inlet 51 may be discharged therefrom through a valve or faucet 84 (Fig. 9) to which may be connected a water gauge 85 for registering the height of the water in the chamber 20. It will be observed that the water in the chamber 20 which is heated by the burner 69 to a set or desired temperature does not mix with the fresh water passing through the tube 60 but is utilized to heat the water in the heating tube prior to discharge of this heated water through the swivel spray head 65. Associated with one side 17 of the container 15 is a thermostatically controlled switch 86, an indicator light or lamp 87 (Fig. 1), and also a start button 88 and a stop button 89 which are electrically connected in circuit to other parts of the apparatus in order to provide means for automatically controlling the various parts during the brewing of the coffee.

In Figure 10 is shown diagrammatically the electrical arrangement of the various parts and while these parts are not located in exactly the same arrangement as they appear in the apparatus, they clearly illustrate the selected circuit arrangements for brewing the coffee in accordance with the present invention. Preferably, the valve 67 is electrically operable and may include a suitable magnetic means 90 to which the stem 67' of the valve is operatively connected to control the opening and closing of the valve. Electric current from any suitable source is supplied to the apparatus through the positive wire 92 and the negative wire 93. The wire or lead 92 constitutes the grounded side of the line or holding circuit. The thermostatic switch 86 is connected through the wire 94 with the lead 92 and is also connected in series with the heater 69 and lamp 87 through the wires 95 and 96. A wire 97 electrically connects the other side of the thermostatic switch to a contact 98 of a snap switch 99 having its other contact 100 connected through the lead 101 to the wire 93 as at 102. A relay 103 has a solenoid 104 connected on one side through the line 105 with the line 92 as at 106 and the line 105 at its opposite end is connected to a contact 107 of a two-point push button 108 having spaced movable contacts 109 arranged to engage complementary fixed contacts 110 to close a circuit through the lines 111 and 112. The line 111 is connected to the magnetic means 90 for controlling the valve 67 while the line 112 is connected to the terminal 113 of the stop button contact 89. The other contact 114 of the stop button 89 is connected through the line 115 to a movable contact 116 of the normally closed double switch 123 of relay 117. The line 93 is connected to the solenoid 118 of the relay 117 and has a branch line 119 connected to the terminal contact 120 of the starting switch 88. The other contact 91 of the switch 88 is connected by the wire 91' to solenoid 104. The wire 119 is also connected through the line 121 with a stationary contact 122 that normally is engaged by the movable contact 116 of the switch 123. A line 124 connects the movable contact 125 of the switch 123 with the line 119 and the fixed contact 126 of the switch 123 is connected by the line 127 to a contact in the magnetic valve means 90.

In operation, the ground coffee is initially placed in the baskets 34 directly under one of the lids 44, the spray arm 65 is then swung into position over the center of the coffee basket 34. Previously, the proper amount of water has been introduced into the chamber 20 through the branch 48 and nozzle 51. The snap switch 99 is now closed so that the water in the compartment 20 is heated by the electrical burner 69 and the lamp 87 is lit. When the temperature of this water reaches a predetermined point, the thermostatic switch 86 operates so as to put out the light 87. This is a signal for the operator to actuate the starting switch 88 which, in turn, energizes the solenoid 104 of the relay 103 so as to move the normally opened switch 108 to close the contacts 109 with the fixed contacts 110 and establish a circuit through the lines 111 and 112, thus closing the holding circuit which, in turn, operates the magnetic valve 90 so as to open the same and allow the water to flow through the heating tube 60 in order to be heated by the temperature of the water in the chamber 20 prior to being discharged by the spray head 65 into the coffee basket 34. When the water in the chamber 20 reaches a predetermined height as determined by the position of the electrode 70 in each of the receptacles 22, the relay 117 is energized so as to move the contact switch 123 from its normally closed position to its open position, with the result that the electric circuit to the magnetic valve 90 is opened, thus causing the valve 67 to be closed in order to prevent further flow of the water through the heating tube 60. As the energization of the solenoid 117 breaks the circuit of the switch 123, it also opens the holding circuit through the relay 103. It will be seen that in order to open the magnetic valve 90 to allow the flow of water into the heating tube 60, that the start button 88 must be pressed so as to close the circuit in the manner as previously described. The water from the main supply 46 is introduced into the coils of the tube 60 so as to circulate around the receptacles 22 and as the tube is immersed in the heating liquid in the chamber 20, this fresh water is heated or boiled to the desired temperature prior to being discharged through the spray head 65 onto the coffee grounds in the basket 34. In other words, the water used in brewing the coffee is brought directly from the supply pipe 46 and tube 60 to mix with the coffee and is not drawn out of any water in the chamber 20. Moreover, the water in the chamber 20 is heated by the burner 69 to a predetermined temperature as set by the thermostat 86 so as to heat the water circulating through the coils of the tube 60 prior to its discharge through the spray head 65. The valve 52 in the supply pipe 49 is manually operated and is used to admit fresh water into the tank 20 to replenish the supply that evaporates off or is drawn off through the faucet 84. The electrodes 70 are housed in the tubular members 75 and standards 79 so as to be electrically connected to the relay 117 in the manner as shown in Figure 10. The bottom of each of the receptacles 22 may be grounded by the wire 128 (Fig. 10) so as to provide a closed circuit with the wire 76.

Instead of providing electrical controls, such as 90, for regulating the flow of the water through the valve 67, manual means such as the valve 129 may be substituted for the valve 67 in the branch supply pipe 53 (Fig. 11), so that opening of the valve 129 starts the brewing process while closing of the valve 129 stops the brewing. Otherwise, the manual method of controlling the making of the coffee is substantially the same as the automatic or electrical method previously described. It is significant to note that in both methods of making the coffee, the water used in the brewing is brought in directly from the supply line and is uniformly heated to the proper temperature by the heated water in the chamber 20, the temperature of which is thermostatically controlled. When the coffee in the receptacle 22 reaches the level of the electrode 70, the supply is automatically shut off. After the filtration is finished, the basket 34 is removed and the brewed coffee in the receptacle 22 is ready to be withdrawn through one of the faucets 25. In the electrical operation of the valve 67, when the light 87 goes out, it indicates that the temperature of the water in the chamber 20 has reached the boiling point to insure proper and uniform brewing of the coffee, and the valve 67 is then opened by the electrically operating means 90, so as to treat a new batch of coffee. In the manual method, the operator actuates the valve 129, (Fig. 11) so as to allow the water to flow through the supply branch 55 into the coils of the heating tube 60. When the coffee in the receptacle 22 reaches a predetermined height or level as indicated by the gauge 27 (Fig. 1), the operator manually turns off the valve 129 and the coffee is then ready to be served. The water in the chamber 20 may be heated by a 220 volt electrical element to approximately 212° F. so that the water from the main supply is brought in through the copper tubing 60 to travel inside of the chamber 29 and ultimately be discharged through the spray arm 63 into the coffee grounds and mix therewith to produce the liquid coffee that percolates through the filtering material 35 into the chamber 22 to a height as determined by the electrode 70 before the control valve 67 is cut off. The temperature of the water in the chamber 20 may be readily determined by a thermometer 130 on the front side 17 of the receptacle (Fig. 1). Thus, it will be seen that simple, efficient and economical means are provided for insuring the coffee being made with the desired flavor, strength and taste, and at a minimum of handling and free from objectionable gases.

It will be understood that the several forms of the invention shown are merely illustrative of preferred embodiments and that such changes may be made as come within the scope of the following claim.

I claim:

A coffee brewing apparatus including a container having a transverse partition therein forming an upper chamber and a lower chamber, the top of said container having spaced openings, coffee brewing receptacles extending through said openings into said upper chamber, a burner in said upper chamber, means for introducing water into said upper chamber so as to be heated by said burner, a water supply pipe extending into said lower chamber and having a branch pipe connected with the interior of said upper chamber, a heating tube coiled in said upper chamber and encircling said receptacles, said supply pipe having a second branch pipe connected to one end of said heating tube, a spray arm movably connected to the other end of said heating tube and arranged to be positioned above said coffee receptacles so as to discharge the heated water from the tube into a receptacle during the coffee brewing operation, thermostatic means for controlling the heating of the water in said upper chamber to a predetermined temperature, an electrically operable valve in said second branch pipe for controlling the flow of the water into the heating tube, and electrically operable means in said receptacles and connected to said valve so as to cut off the flow of the water to the heating tube when the liquid coffee in a receptacle reaches a predetermined level.

RUDOLPH W. JOHNSON.

REFERENCES CITED

The following references are of record in the file of this patent:

UNITED STATES PATENTS

| Number | Name | Date |
| --- | --- | --- |
| Re. 22,879 | Peters et al. | May 13, 1947 |
| 1,157,805 | Ray | Oct. 26, 1915 |
| 1,508,809 | White | Sept. 26, 1924 |
| 1,869,720 | Strand et al. | Aug. 2, 1932 |
| 1,882,247 | Levings | Oct. 11, 1932 |
| 2,360,194 | Bright | Oct. 10, 1944 |
| 2,457,903 | Kantor et al. | Jan. 4, 1949 |
| 2,462,019 | Bowman et al. | Feb. 15, 1949 |
| 2,488,817 | Kaminky | Nov. 23, 1949 |
| 2,493,932 | Swanson | Jan. 10, 1950 |